United States Patent Office 3,080,277
Patented Mar. 5, 1963

3,080,277
ALPHA - DIALKYLTHIO - (DITHIO) - PHOSPHORYL ALPHA-PHENYLACETIC ESTERS OF CYANOHYDRIN, AND PARASITICIDAL COMPOSITION CONTAINING SAID ESTERS
Cesare Augusto Peri, Giorgio Rossi, and Giannantonio Michieli, Milan, Italy, assignors to Montecatini Società Generale per l'Industria Mineraria e Chimica, Milan, Italy, a corporation of Italy
No Drawing. Filed Nov. 8, 1960, Ser. No. 67,897
Claims priority, application Italy Nov. 11, 1959
13 Claims. (Cl. 167—30)

The present invention relates to a new class of thio- and dithio-phosphoric acid esters which fall within the general formula:

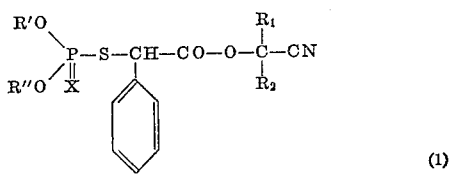

(1)

in which R' and R'' are alkyl groups of a low molecular weight, R' being equal to, or different from R'', $R_1$, $R_2$ are H, alkyl, aryl radicals and X is oxygen or sulfur, and to the process for the preparation of the above mentioned esters, and also to their application as pesticides.

Laboratory tests have demonstrated that said compounds have toxic action on plant and domestic parasites. Some of them have an especially high toxic action against mites and their eggs.

The present invention is also directed to parasiticidal preparations or compositions containing or comprising compounds of the class defined by the above general formula.

Another object of the present invention is the provision of a new class of α-halo α-phenylacetic esters of cyanohydrin. They are used as intermediates for preparation of compounds falling within the above general formula. Their process of preparation is also part of this invention.

Compounds of the formula 1 are obtained by reacting a metal compound of an O-O-dialkylthio (or dithio-) phosphoric acid, of the formula:

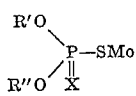

where R', R'' and X have the above mentioned meaning and Me is an alkali metal or is ammonium, with an α-halo α-phenylacetic ester of a cyanohydrin, of the formula:

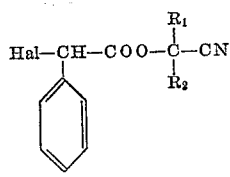

in which Hal can be chlorine, bromine or iodine and $R_1$, $R_2$ have the aforesaid meaning.

The reaction can be carried out in the presence of solvents for one or both of the reactants. Ketones, particularly acetone, are very suitable solvents.

It is often advisable to use an excess of metallic dialkylphosphate. The reaction which occurs even at room temperature, can be accelerated by heating at 50–60° C. The metal halide thus formed as by-product can be removed either by filtration or by addition of water, which causes the dissolution of the inorganic salt and the contemporaneous precipitation of the desired product.

The phosphoric esters of the general Formula 1 are oily, colorless, or light yellow colored liquids, which are almost water insoluble, but are soluble in alcohol, benzene, acetone, dioxane and in other commonly used organic solvents, with the exception of the aliphatic hydrocarbons.

The α-halo α-phenylacetic esters of cyanohydrins used as intermediate products in the preparation of compounds of the above general formula are made by adding the halide of the α-halo-phenylacetic acid to a mixture of cyanohydrin, anhydrous pyridine, and petroleum ether, the mixture being cooled at 0° C.

The temperature of the reaction mixture must always be kept at 0° C. The pyridine halide thus formed is removed while the liquid is concentrated on a water bath under reduced pressure. The residue is diluted with methylene chloride, shaken with ice water, and its acidity then neutralized with $NaHCO_3$. After dehydrating the organic layer with $NaSO_4$, the substance is concentrated on a water bath. A residue consisting of the alpha-halo-phenylacetic esters of a cyanohydrin is thus obtained. The product can be purified by distilling it under vacuum.

Among the compounds comprised in the general Formula 1, the compound α-(O,O-diethyldithiophosphoryl) α-phenylacetic ester of acetoncyanohydrin, namely

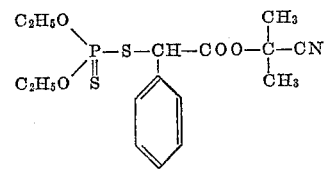

(2)

has shown particular effectiveness. Said compound has an acaricidal activity about 18 times that of parathion (p-nitrophenyl-diethyldithiophosphate). It is a surprising fact that this new compound shows a higher parasiticidal activity than the other compounds having a similar constitution, and the phosphoric esters commonly used as parasiticides, not only against the mites of different growth stage, but on their eggs also.

The compounds of the present invention can be used in various ways. Generally, it is preferable to dilute them with solid, liquid or semi-solid carriers, i.e. wetting agents, adhesives, dispersion agents, emulsifiers can be added to form a paste. The active substances can be also dispersed in air by fumigation, or as aerosols. Other substances having insecticidal activity can be associated with them, such as phosphoric esters, dichlorodiphenyltrichloroethane, the γ-isomer of hexachlorocyclohexane, octachloro-4-7-methane-tetrahydro-indane, etc. The invention is illustrated by the following examples, which are not intended to be limitative.

EXAMPLE 1

The present example relates to the preparation of the intermediate product, α-bromo-α-phenylacetic ester of acetoncyanohydrin, which is a new substance not described in the chemical literature. 278 grams of α-bromo-α-phenylacetic acid bromide are slowly added to a mixture of 85 grams acetoncyanohydrin

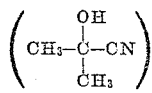

79 grams anhydrous pyridine and 180 ml. petroleum ether, said mixture being cooled at 0° C. The pyridine hydrobromide thus formed is removed, the liquid being concentrated on a water bath under reduced pressure. The residue is diluted with methylene chloride, shaken with ice water and its acidity neutralized with NaHCO₃. After dehydration of the organic layer with Na₂SO₄, the mass is concentrated on a water bath. 219 g. consisting of α-bromo-α-phenylacetic ester of acetoncyanohydrin are obtained as residue. The product can be purified by distilling it under vacuum and collecting the fraction which distills at 124° C. under 0.6 mm. Hg of pressure.

EXAMPLE 2

28.2 grams of α-bromo-α-phenylacetic ester of acetoncyanohydrin prepared according to Example 1, and dissolved in 30 ml acetone, are added to a solution of 26 g. of sodium O,O-dimethyl-dithiophosphatedihydrate in 60 ml. acetone. Heat is released and NaBr is separated. The reaction mixture is heated under reflux for 30 minutes and, after cooling, the NaBr formed (9 g.) is removed by filtration. The liquid is concentrated under reduced pressure until the volume is reduced by half, and it is then diluted with 200 ml. water. The oil thus separated is extracted with methylene chloride. The low acidity which develops is neutralized with the necessary amount of aqueous saturated NaHCO₃. The organic layer is dehydrated on Na₂SO₄ and the solvent is removed on a water bath.

The residue is washed 5 times with n-hexane (with about 10 ml. each time) by shaking it in a separatory funnel; the fraction dissolved in n-hexane is discarded. The oily liquid obtained consists substantially of α-(O,O-dimethyldithiophosphoryl) α-phenylacetic ester of acetoncyanohydrin, of the structural formula.

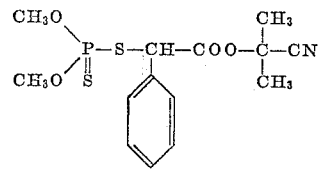

EXAMPLE 3

28.2 grams of α-bromo-α-phenylacetic ester of acetoncyanohydrin, prepared according to Example 1, and dissolved in 30 ml. acetone, are added to a solution of 25 g. of potassium O,O-diethyl-thiophosphate in 60 ml. acetone. The mixture is heated under reflux for 30 minutes and, after cooling, 100 ml. water are added. The mixture, if necessary, is neutralized with NaHCO₃, and then extracted with methylene chloride. After dehydration of the organic layer with NaSO₄, the mixture is concentrated on a water bath and the last traces of solvent are removed under reduced pressure.

26 g. of an oil are obtained, substantially consisting of α-(O,O-diethylthiophosphoryl) α-phenylacetic acid of acetoncyanohydrin:

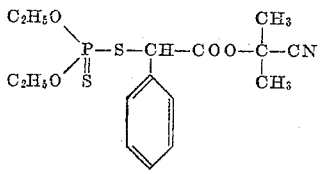

EXAMPLE 4

28.2 grams of α-bromo-α-phenylacetic ester of acetoncyanohydrin, dissolved in 30 ml. acetone, are added to a solution of 27 g. of potassium O,O-diethyldithiophosphate in 60 ml. acetone. By operating as described in Example 2, 35 g. of an oil which consists substantially of α-(O,O-diethyldithiophosphoryl) α-phenylacetic ester of acetoncyanohydrin, of the formula:

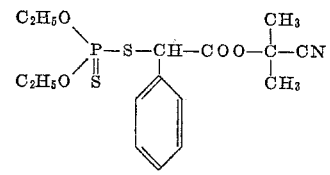

are obtained.

Analysis: P, percent found=7.66–7.62 (the theoretical value for C₁₄H₂₀O₄PS₂N=7.99). S, percent found= 16.58–16.50 (the theoretical value for C₁₄H₂₀O₄PS₂N= 16.54).

EXAMPLE 5

25.4 of α-bromo-α-phenylacetic ester of formalcyanohydrin and 25 g. of O,O-diethyldithiopotassiumphosphate are mixed in 60 ml. acetone. A highly exothermic reaction takes place. The mixture is allowed to stand for about 20 hours at room temperature (20–25° C.); most of the solvent is then evaporated under vacuum (15 mm. Hg). The residue is poured into 100 ml. water, and taken up again with 60 ml. methylene chloride. The extract in methylenechloride is washed twice with 50 ml. water, then dried on NaSO₄, and evaporated under vacuum. The residue consists of 35 g. of a limpid straw-colored oil consisting of α-(O,O-diethyldithiophosphoryl) α-phenylacetic ester of formalcyanohydrin, of the formula:

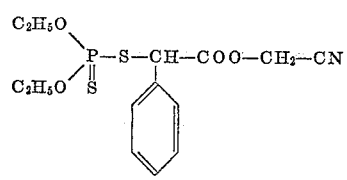

EXAMPLE 6

25.4 grams of α-bromo-α-phenylacetic ester of formalcyanohydrin and 20.8 g. of O,O-diethylthiopotassiumphosphate are mixed in 60 ml. acetone. The mixture is allowed to stand for 20 hours. The potassium bromide formed is then filtered, and the mixture evaporated under vacuum up to constant weight. The residue consists of 32.5 g. of a light straw-colored oil which is substantially α-(O-O-diethylthiophosphoryl) α-phenylacetic ester of formal cyanohydrin:

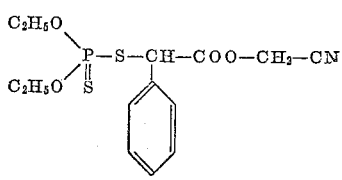

EXAMPLE 7

38 grams of α-bromo-α-phenylacetic ester formalcyanohydrin and 36 g. of sodium O,O-dimethyl-dithiophosphate (the hydrate salt with a titer of about 83%) are mixed in 70 ml. acetone. The reaction mixture is heated at 40–50° C. and allowed to stand for 20 hours. The solvent is evaporated under vacuum. The residue is poured into 100 ml. water, taken up again with 60 ml. methylene chloride. The extract in methylene chloride is twice washed with 50 ml. water, dried and evaporated under vacuum. The residue (37.5 g.) is continuously extracted with n-hexane at room temperature (25–30° C.) until 32 g. of residue are obtained, after removing, under vacuum, the solvent dissolved therein. Said substance corresponds to α-(O,O-dimethyldithiophosphoryl) α-phenylacetic ester of formalcyanohydrin, of the formula:

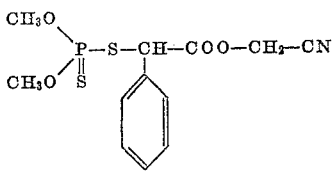

EXAMPLE 8

20 g. of bromo-α-phenyl acetic ester of methyl-ethyl-keto-cyanohydrin and 19.7 g. of potassium O,O-diethyldithiophosphate are mixed with 100 ml. of acetone. Heat is developed by the reaction and KBr is separated.

The mixture is refluxed for 20 minutes and the inorganic salt is removed by filtration. The acetone solution is concentrated under pressure; the residue is treated with 20 ml. of methylene chloride and then twice with 60 cc. of ice-cold water. After dehydration with $MgSO_4$, the solvent is removed under reduced pressure thus obtaining 24 g. of a residue consisting of the α-(O,O-diethyldithiophosphoryl)-α-phenylacetic ester of methyl-ethyl-keto-cyanohydrin:

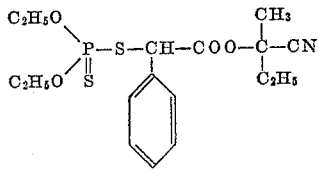

in the form of an oil.
Analysis: P, 7.55%, calculated 7.72%.

EXAMPLE 9

20.2 g. of α-bromo-α-phenylacetic ester of acetalcyanohydrin and 20.2 g. of potassium diethyldithiophosphate are mixed with 100 ml. of acetone. By operating as described in Example 1, 22.4 g. of an oil consisting of α-(O,O-diethyl-dithiophosphoryl)-α-phenylacetic ester of acetalcyanohydrin, are obtained.

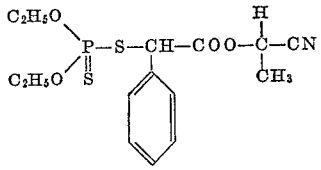

Analysis: P, 8.13%; calculated 8.30%.

EXAMPLE 10

16 g. of α-bromo-α-phenylacetic ester of benzalcyanohydrin and 13.44 g. of potassium diethyldithiophosphate are mixed with 80 ml. of acetone. An exothermic reaction takes place with separation of KBr. The mixture is refluxed for 20 minutes and the inorganic salt is removed by filtration. The acetone solution is concentrated under vacuum, the residue is treated with 30 ml. of methylene chloride and then 3 times with 40 of ice-cold water. After dehydration with $MgSO_4$, the solvent is removed under reduced pressure thus obtaining 18.8 g. of a residue consisting of α-(O,O-diethyldithiophosphoryl)-α-phenylacetic ester of benzalcyanohydrin:

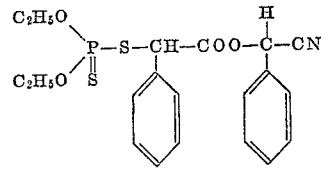

Analysis: N, 3.05%; calculated 3.21.

EXAMPLE 11

28.2 g. of α-bromo-phenylacetic ester of acetoncyanohydrin and 23 g. of potassium O-methyl-O-ethyl-dithiophosphate are mixed in the presence of 150 ml. of acetone. The reaction is exothermic, with the formation of KBr.

The mixture is refluxed for 30 minutes and is then cooled; the inorganic salt is removed by filtration. The acetone solution is concentrated under reduced pressure; the residue is treated with 50 ml. of methylene chloride and is washed 3 times with water (60 ml. each time).

After drying on $CaCl_2$ the solvent is removed under reduced pressure, thus obtaining as a residue 31.5 g. of a light reddish oil which after some time solidifies almost completely. The product, crystallized from methanol, presents a melting point of 52–53.5° C.

It mainly consists of the alpha-(O-methyl-O-ethyl-dithiophosphoryl)-phenylacetic ester of acetonecyanohydrin having the formula:

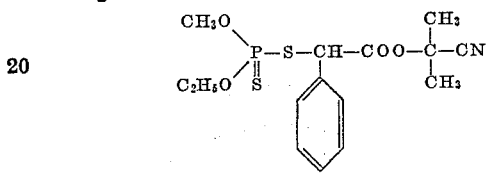

P calculated: 8.29%. P found: 8.28–8.23%.

EXAMPLE 12

26.8 g. of alpha-bromophenylacetic ester of acetalcyanohydrin and 23 g. of potassium O-methyl-O-ethyl-dithiophosphate are mixed in the presence of 150 ml. of acetone. By operating substantially as described in Example 1, 30 g. of a reddish oil, having $D_4^{20}=1.237$ and $n_D^{20}=1.5503$, are obtained.

It mainly consists of the α-(O-methyl-O-ethyl-dithiophosphoryl)-α-phenylacetic ester of acetalcyanohydrin, having the formula:

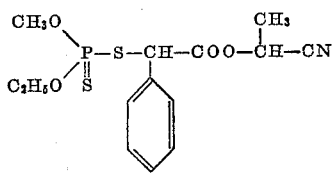

P calculated: 8.62%. P found: 8.58–8.62%.

EXAMPLE 13

29.6 g. of bromo-phenylacetic ester of methyl-ethyl-keto-cyanohydrin and 23 g. of potassium O-methyl-O-ethyl-dithiophosphate are mixed in the presence of 150 ml. of acetone. By operating substantially as described in Example 1, 33 g. of a reddish oil, having $D_4^{20}=1.189$ and $n_D^{20}=1.5379$, are obtained.

It mainly consists of alpha-(O-methyl-O-ethyl-dithiophosphoryl)-alpha-phenylacetic ester of methyl ethyl keto-cyanohydrin having the formula:

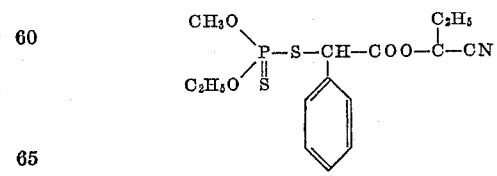

P calculated: 7.99%. P found: 7.96–7.99%.

EXAMPLE 14

25.4 g. of alpha-bromophenylacetic ester of formalcyanohydrin and 23 g. of potassium O-methyl-O-ethyl-dithiophosphate are mixed in the presence of 100 ml. of acetone. By operating substantially as described in Example 1, 34 g. of a reddish oil, having $D_4^{20}=1.259$ and $n_D^{20}=1.5520$ are obtained.

It mainly consists of alpha-(O-methyl-O-ethyl-dithiophosphoryl)-alpha-phenylacetic ester of formalcyanohydrin, having the formula:

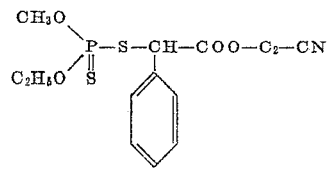

EVALUATION OF THE BIOLOGICAL ACTIVITY OF THE COMPOUNDS OBTAINED ACCORDING TO THE FOREGOING EXAMPLES

The tests prove that the products of the above general formula claimed here have technologically significant insecticidal and acaricidal properties, making them suitable for use in the parasite control, particularly against mites and their eggs. The following tabulation of test results illustrates this.

EXAMPLE 15

Tetranychus telarius L.

A mixed population of Tetranychus telarius in various stages of growth of bean plants was treated under standardized conditions with aqueous dispersions of the compounds to be tested. 24 hours after treatment, the average mortality percentage were as follows:

| Substance | Concentr. active subst., p.p.m. | Mortality, percent | LD 95 concentr. active subst., p.p.m. |
|---|---|---|---|
| α-(O-O-dimethyldithiophosphoryl)-α-phenylacetic ester of acetoncyanohydrin. | 10<br>5<br>2.5<br>1.25<br>0.62 | 100<br>91<br>66<br>11<br>0 | 5.8 |
| α-(O-O-diethylthiophosphoryl) α-phenylacetic ester of acetoncyanohydrin. | 10<br>5<br>2.5<br>1.25<br>0.62<br>0.31 | 100<br>96<br>86<br>55<br>19<br>3 | 4 |
| α-(O-O-diethyldithiophosphoryl)-α-phenylacetic ester of acetoncyanohydrin. | 1.25<br>0.62<br>0.31<br>0.16<br>0.08 | 100<br>99<br>89<br>50<br>10 | 0.42 |
| α-(O-O-diethyldithiophosphoryl) α-phenylacetic ester of formalcyanohydrin. | 100<br>50<br>25<br>12.5<br>6.2 | 99.5<br>90<br>53<br>19<br>5 | 63 |
| α-(O-O-diethylthiophosphoryl) α-phenylacetic ester of formalcyanohydrin. | 80<br>40<br>20<br>10<br>5<br>2.5 | 100<br>99.5<br>86<br>51<br>14<br>0 | 28 |
| α-(O-O-dimethyldithiophosphoryl) α-phenylacetic ester of formalcyanohydrin. | 1,000<br>200<br>100<br>50<br>25<br>10 | 100<br>99<br>94<br>65<br>22<br>0 | 120 |
| α-(O-O-diethyldithiophosphoryl) α-phenylacetic ester of methyl-ethyl-ketocyanohydrin (compound A). | 5.00<br>2.50<br>1.25<br>0.62<br>0.31 | 100<br>96<br>93<br>63<br>20 | 1.5 |
| α-(O-O-diethyldithiophosphoryl)-α-phenylacetic ester of acetal-cyanohydrin (compound B). | 80.0<br>40.0<br>20.0<br>10.0<br>5.0<br>2.50<br>1.25 | 100<br>98<br>92<br>85<br>67<br>48<br>23 | 23 |
| α-(O-O-diethyldithiophosphoryl)-α-phenylacetic ester of benzal-cyanohydrin (compound C). | 1,000<br>100<br>10 | 100<br>28<br>0 | <1,000 |
| α-(O-methyl-O-ethyldithiophosphoryl)-α-phenyl-acetic ester of acetonecyanohydrin. | 1.00<br>0.50<br>0.25<br>0.125 | 100<br>93<br>43<br>3 | 0.53 |
| α-(O-methyl-O-ethyldithiophosphoryl)-α-phenyl-acetic ester of methyl-ethyl-ketocyanohydrin. | 1.000<br>0.500<br>0.250<br>0.125 | 100<br>92<br>58<br>17 | 0.6 |
| α-(O-methyl-O-dithiophosphoryl)-α-phenylacetic ester of formal-cyanohydrin. | 100.0<br>50.0<br>25.0<br>12.5 | 100<br>96<br>63<br>11 | 48 |

EXAMPLE 16

Eggs of Tetranychus telarius

Eggs of Tetranychus telarius laid on young bean plants were treated under standardized conditions, with aqueous dispersions of the substances to be tested. Six days after treatment the lecture on the stereomicroscope was made, and the average hatching percentage determined.

| Substance | Concentr. active subst., p.p.m. | Eggs not opened percent | LD 95 (conc. active subst., p.p.m.) |
|---|---|---|---|
| α-(O,O-dimethyldithiophosphoryl)-α-phenylacetic ester of acetoncyanohydrin. | 1,000<br>100 | 68<br>0 | 1,000 |
| α-(O,O-diethyldithiophosphoryl)-α-phenylacetic ester of acetoncyanohydrin. | 1,000<br>100 | 90<br>10 | 1,000 |
| α-(O,O-diethyldithiophosphoryl)-α-phenylacetic ester of acetoncyanohydrin. | 200<br>100<br>50<br>25<br>12.5 | 100<br>99<br>95<br>79<br>52 | 55 |
| α-(O,O-diethyldithiophosphoryl)-α-phenylacetic ester of formalcyanohydrin. | 1,000<br>100 | 26<br>0 | 1,000 |
| α-(O,O-diethylthiophosphoryl)-α-phenylacetic ester of formalcyanohydrin. | 1,000<br>100 | 2<br>0 | 1,000 |
| α-(O,O-dimethyldithiophosphoryl)-α-phenylacetic ester of formalcyanohydrin. | 1,000<br>100 | 32<br>0 | 1,000 |
| Compound A | 1,000<br>100<br>50<br>25<br>12.5<br>6.2 | 100<br>95<br>87<br>75<br>54<br>5 | 93 |
| Compound B | 1,000<br>100 | 15<br>2 | -------- |
| Compound C | 1,000<br>100 | 41<br>5 | >100 |
| α-(O-methyl-O-ethyl-diethylphosphoryl)-α-phenylacetic ester of acetone cyanohydrin. | 1,000<br>500<br>250<br>125<br>62<br>31<br>16<br>8 | 100<br>97<br>93<br>90<br>75<br>65<br>38<br>12 | 23 |
| α-(O-methyl-O-ethyl-dithiophosphoryl)-α-phenylacetic ester of acetal cyanohydrin. | 1,000<br>100 | 11<br>0 | 1,000 |
| α-(O-methyl-O-ethyl-dithiophosphoryl)-α-phenylacetic ester of methyl ethyl-ketocyanohydrin. | 400.0<br>200.0<br>100.0<br>50.0<br>25.0<br>12.5 | 99<br>95<br>87<br>66<br>47<br>23 | 29 |
| α-(O-methyl-O-ethyl-dithiophosphoryl)-α-phenylacetic ester of formal cyanohydrin | 1,000 | 4 | 1,000 |

EXAMPLE 17

Tetranychus telarius L.

Comparison of the parasiticidal activity of p-nitrophenyl-diethyldithiophosphate (parathion) with that of α-(O,O-diethylphosphoryl) α-acetic ester of acetoncyanohydrin:

| Substance | Concentr. active subst., p.p.m. | Mortality, percent | LD 95 conc. active subst., p.p.m. | Acaricidal activity (with equal doses of parathion) |
|---|---|---|---|---|
| p-Nitrophenyldiethyldithiophosphate (Parathion). | 20<br>10<br>5<br>0.5<br>1.25<br>0.62 | 100<br>98<br>85<br>33<br>1<br>0 | 7.5 | 100 |
| α-(O,O-diethyldithiophosphoryl) α-phenylacetic ester of acetoncyanohydrin. | 1.25<br>0.62<br>0.31<br>0.16<br>0.08 | 100<br>99<br>89<br>50<br>10 | 0.42 | 1,785 |
| Compound A | 5.00<br>2.50<br>1.25<br>0.62<br>0.31 | 100<br>96<br>93<br>63<br>20 | 1.5 | 500 |

EXAMPLE 18

Eggs of Tetranychus telarius

Comparison of the activity of p-chlorobenzene sulphonate of p-chlorobenzene sulphonate of p-chlorophenyl with that of α-(O,O-diethyldithiophosphoryl)-α-phenylacetic ester of cyanohydrin:

| Substance | Concentr. active subst., p.p.m. | Eggs not opened, percent | LD 95 conc., p.p.m. | Activity against eggs with equal doses of chlorobenzenesulphonate of p-chlorophenyl |
|---|---|---|---|---|
| p-Chlorobenzenesulphonate of p-chlorophenyl. | 120<br>100<br>50<br>25<br>10 | 100<br>99<br>88<br>66<br>30 | 60 | 100 |
| α-(O,O-diethyldithiophosphoryl) α-phenylacetic ester of acetoncyanohydrin. | 200<br>100<br>50<br>25<br>12.5 | 100<br>99<br>95<br>79<br>52 | 55 | 110 |
| Compound A | 1,000.0<br>100.0<br>50.0<br>25.0<br>12.5<br>6.2 | 100<br>95<br>87<br>75<br>54<br>5 | 100 | 65 |

EXAMPLE 19

Musca domestica L.

Upon topical application, by means of a microsyrine, of acetone solutions of the product under examination on five days old female flies, the following results have been obtained:

| Substance | Dose, γ/fly | Percent mortality 20 hours | DL 50, γ/fly |
|---|---|---|---|
| α-(O,O-dimethyldithiophosphoryl)-α-phenylacetic ester of acetoncyanohydrin. | 4<br>2 | 92<br>40 | 2.2 |
| α-(O-O-diethylthiophosphoryl)-α-phenylacetic ester of acetoncyanohydrin. | 1.00<br>0.75<br>0.56<br>0.42 | 95<br>79<br>56<br>25 | 0.53 |
| α-(O,O-diethyldithiophosphoryl)-α-phenylacetic ester of acetoncyanohydrin. | 0.8<br>0.6<br>0.45 | 89<br>68<br>33 | 0.52 |
| α-(O,O-diethyldithiophosphoryl)-α-phenylacetic ester of formalcyanohydrin. | 0.7<br>0.525<br>0.393 | 86<br>59<br>20 | 0.5 |
| α-(O,O-diethylthiophosphoryl)-α-phenylacetic ester of formalcyanohydrin. | 0.5<br>0.375<br>0.281<br>0.210 | 93<br>88<br>64<br>29 | 0.25 |
| α-(O,O-dimethyldithiophosphoryl)-α-phenylacetic ester of formalcyanohydrin. | 2.00<br>1.50<br>1.25<br>0.84 | 100<br>88<br>63<br>25 | 1.07 |
| Compound A | 0.93<br>0.70<br>0.525 | 89<br>42<br>8.6 | 0.72 |
| Compound B | 1<br>0.75<br>0.56 | 79<br>35<br>10 | 0.82 |
| Compound C | 4 | 40 | >4 |
| α-(O-methyl-O-ethyldithio-phosphoryl) α-phenylacetic esters of acetonecyanohydrin (Ex. 11). | 1.50<br>1.12<br>0.84<br>0.63 | 100<br>83<br>67<br>34 | 0.75 |
| α-(O-methyl-O-ethyl-dithiophosphoryl)-α-phenyl-acetic ester acetalcyanohydrin (Ex. 12). | 7.00<br>5.33<br>4.00<br>3.00<br>2.25 | 100<br>94<br>77<br>61<br>32 | 2.7 |
| α-(O-methyl-ethyl-dithiophosphoryl)-α-phenyl acetic ester of methyl-ethyl ketocyanohydrin (Ex. 13). | 2.66<br>2.00<br>1.50<br>1.12<br>0.84 | 100<br>98<br>85<br>61<br>25 | 1.03 |
| α-(O-methyl-O-ethyl-dithiophosphoryl)-α-phenyl acetic ester of formal cyanohydrin (Ex. 14). | 1.060<br>0.800<br>0.600<br>0.450<br>0.337 | 100<br>89<br>67<br>29<br>10 | 0.52 |

EXAMPLE 20

Aphis fabae

The insects are bred on bean plants under artificial light, under standardized conditions. The population of aphides is nebulized with suitably formulated aqueous dispersions of the compounds considered:

| Substance | Concentr. active subst., p.p.m. | Percent mortality 24 hours | LD 95 |
|---|---|---|---|
| α-(O,O-dimethyl-dithiophosphoryl)-α-phenylacetic ester of acetoncyanohydrin. | 1,000<br>100<br>10 | 100<br>69<br>13 | 500 |
| α-(O,O-diethylthiophosphoryl)-α-phenylacetic ester of acetoncyanohydrin. | 100<br>50<br>25<br>12.5<br>6.2<br>3.1 | 100<br>96<br>74<br>42<br>11<br>0 | 47 |
| α-(O-O-diethyl-dithiophosphoryl)-α-phenylacetic ester of formalcyanohydrin. | 100<br>50<br>25<br>12.5<br>6.2 | 99<br>92<br>53<br>25<br>2 | 64 |
| α-(O-O-diethyl-dithiophosphoryl)-α-phenylacetic ester of acetoncyanohydrin. | 200<br>100<br>50<br>25<br>12.5<br>6.2<br>3.1 | 100<br>97<br>95<br>81<br>56<br>31<br>10 | 50 |
| α-(O-O-diethylthiophosphoryl)-α-phenylacetic ester of formalcyanohydrin. | 80<br>40<br>20<br>10<br>5<br>2.5 | 100<br>100<br>97<br>61<br>27<br>0 | 12 |
| α-(O-O-dimethyl-dithiophosphoryl)-α-phenylacetic ester of formalcyanohydrin. | 1,000<br>200<br>100<br>50<br>25<br>10 | 100<br>100<br>100<br>85<br>35<br>0 | 67 |
| Compound A | 1,000<br>100<br>10 | 100<br>78<br>0 | >100 |
| Compound B | 1,000<br>100<br>10 | 100<br>3<br>0 | >100 |
| Compound C | 1,000<br>100 | 70<br>0 | >100 |
| α-(O-methyl-O-ethyl-dithiophosphoryl)-α-phenylacetic ester of acetone-cyanohydrin (Ex. 11). | 100.0<br>50.0<br>25.0<br>12.5<br>6.2 | 100<br>88<br>58<br>32<br>10 | 78 |
| α-(O-methyl-O-ethyl-dithiophosphoryl)-α-phenylacetic ester of acetalcyanohydrin (Ex. 12). | 1,000<br>500 | 70<br>10 | >1,000 |
| α-(O-methyl-O-ethyl-dithiophosphoryl)-α-phenylacetic ester of methyl-ethyl-ketocyanohydrin (Ex. 13). | 400<br>200<br>100<br>50 | 99<br>89<br>49<br>11 | 260 |
| α-(O-methyl-O-ethyl-dithiophosphoryl)-α-phenyl-acetic ester of formalcyanohydrin (Ex. 14). | 100.0<br>50.0<br>25.0<br>12.5 | 100<br>98<br>72<br>17 | 42 |

EXAMPLE 21

Determination of the acute toxicity on the rat per os and endovenous injection of the α-(O,O-diethyldithiophosphoryl)-α-phenylacetic ester of acetoncyanohydrin The product was dissolved in dimethylacetamide, the single groups of animals tested being half females and half males. LD 50, os 45 mg./kg. LD 50, venous 40 mg./kg.

The compounds in which either or both $R_1$ and $R_2$ are $C_2H_5$ and/or $C_6H_5$ are generally made in the same way from the cyanohydrin of the corresponding aldehyde, or ketone.

By choice of the corresponding aldehyde or ketone cyanohydrin, the radical

can further be as follows

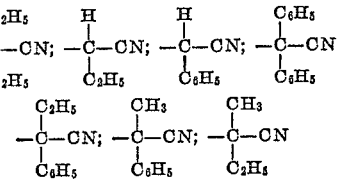

We claim:
1. A parasiticidal compound of the formula:

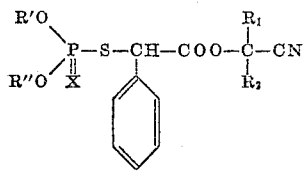

in which R' and R" are alkyl groups of low molecular weight, R' being the same as or different from R"; $R_1$ and $R_2$ are taken from the group consisting of H, $CH_3$, $C_2H_5$, and $C_6H_5$; and X is taken from the group consisting of S and O.

2. A compound of the formula:

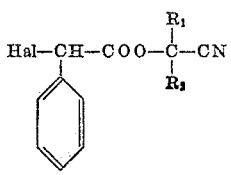

in which Hal is taken from the class consisting of chlorine, bromine, and iodine, and $R_1$, $R_2$ are taken from the class consisting of H, $CH_3$, $C_2H_5$, and $C_6H_5$.

3. A parasiticidal composition containing at least one of the compound defined in claim 1, mixed with a compound of another class of insecticides, and with an inert substance, and a fertilizer compound.

4. A parasiticide, α-(O,O-diethyldithiophosphoryl)-α-phenylacetic ester of acetoncyanohydrin, of the formula:

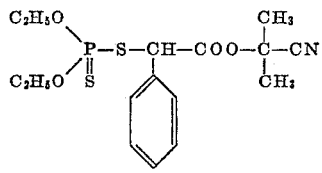

5. A parasiticide α-(O,O-diethyldithiophosphoryl)-α-phenylacetic ester of methyl-ethyl-ketocyanohydrin, of the formula:

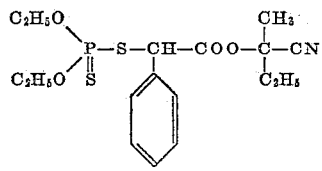

6. An acaricidal composition containing the compounds defined in claims 4 and 5, mixed with another ester of the class defined in claim 1, and with a commonly used insecticide, and mixed with an inert substance, and with a fertilizer compound.

7. In the art of controlling mites, the improvement comprising applying to a locality subject to infestation thereby a compound of the formula:

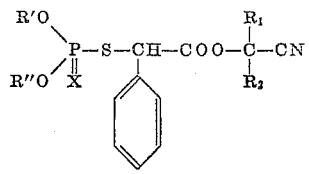

in which R' and R" are alkyl groups of low molecular weight, R' being the same as or different from R", $R_1$ and $R_2$ are taken from the group consisting of H, $CH_3$, $C_2H_5$, and $C_6H_5$; and X is taken from the group consisting of S and O.

8. In the art of controlling insects, the improvement comprising applying to a locality subject to infestation thereby a compound of the formula:

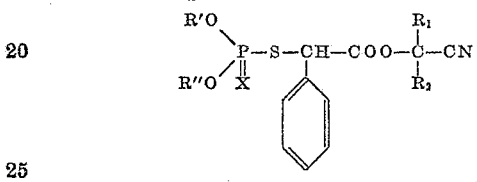

in which R' and R" are alkyl groups of low molecular weight, R' being the same as or different from R", and $R_1$ and $R_2$ are taken from the group consisting of H, $CH_3$, $C_2H_5$, and $C_6H_5$; and X is taken from the group consisting of S and O.

9. In the art of controlling mites, the improvement comprising applying to the locality subject to infestation thereby compounds of the group consisting of those defined in claims 4 and 5.

10. α - (O-methyl-O-ethyl-dithiophosphoryl)-α-phenylacetic ester of acetoncyanohydrin.

11. α - (O-methyl-O-ethyl-dithiophosphoryl)-α-phenylacetic ester of acetalcyanohydrin.

12. α - (O-methyl-O-ethyl-dithiophosphoryl)-α-phenylacetic ester of methyl-ethyl-ketocyanohydrin.

13. α - (O-methyl-O-ethyl-dithiophosphoryl)-α-phenylacetic ester of formalcyanohydrin.

References Cited in the file of this patent

UNITED STATES PATENTS

| | | |
|---|---|---|
| 2,494,284 | Cassaday et al. | Jan. 10, 1950 |
| 2,947,662 | Fusco et al. | Aug. 2, 1960 |
| 2,954,318 | Ludvik | Sept. 27, 1960 |
| 2,956,921 | Santmyer | Oct. 18, 1960 |
| 2,971,974 | Blair | Feb. 14, 1961 |
| 2,977,382 | Millikan | Mar. 28, 1961 |

OTHER REFERENCES

Cyanohydrins, Tech. Bull. SP-133, by Rohm & Haas Co., Washington Square, Philadelphia 5, Pa. (January 1957), page 8.

Royals: "Advanced Organic Chemistry," Prentice-Hall, Inc., Englewood Cliffs, N.J. (1956), page 605.